United States Patent
Nakajima et al.

(10) Patent No.: US 9,393,874 B2
(45) Date of Patent: Jul. 19, 2016

(54) TROLLEY-TYPE TRUCK

(75) Inventors: Atsushi Nakajima, Hitachi (JP);
Hiroyuki Kanazawa, Hitachi (JP);
Tomohiko Yasuda, Tsuchiura (JP)

(73) Assignees: Hitachi Power Solutions Co., Ltd.,
Ibaraki (JP); **Hitachi Construction
Machinery Co., Ltd.**, Tokyo (JP)

( * ) Notice: Subject to any disclaimer, the term of this patent is extended or adjusted under 35 U.S.C. 154(b) by 40 days.

(21) Appl. No.: 14/379,761

(22) PCT Filed: Feb. 22, 2012

(86) PCT No.: PCT/JP2012/054327
§ 371 (c)(1),
(2), (4) Date: Oct. 20, 2014

(87) PCT Pub. No.: WO2013/124994
PCT Pub. Date: Aug. 29, 2013

(65) Prior Publication Data
US 2015/0034441 A1 Feb. 5, 2015

(51) Int. Cl.
*B60L 5/00* (2006.01)
*B60L 5/24* (2006.01)
(Continued)

(52) U.S. Cl.
CPC ............... *B60L 5/24* (2013.01); *B60L 3/0023* (2013.01); *B60L 5/28* (2013.01); *B60L 5/36* (2013.01); *B60L 9/22* (2013.01); *B60L 11/08* (2013.01); *B60L 2200/36* (2013.01); *B60L 2240/12* (2013.01); *B60L 2270/145* (2013.01)

(58) Field of Classification Search
CPC .............. B60L 5/08; B60L 5/19; B60L 5/36; B60L 11/1837; B60L 2200/26; Y02T 10/7005; Y02T 90/14; Y02T 90/128; Y02T 10/7088

USPC ................................................. 191/59.1–60.5
See application file for complete search history.

(56) References Cited

U.S. PATENT DOCUMENTS 1,828,945 A * 10/1931 Rossman ........................ 191/3
4,745,997 A   5/1988 Takei et al.
(Continued)

FOREIGN PATENT DOCUMENTS

| JP | 63-35102 A | 2/1988 |
| JP | 3-63001 U | 6/1991 |

(Continued)

OTHER PUBLICATIONS

International Search Report in corresponding PCT Application No. PCT/JP2012/054327, mailed May 22, 2012.

*Primary Examiner* — Jason C Smith
(74) *Attorney, Agent, or Firm* — Mattingly & Malur, PC

(57) ABSTRACT

A trolley-type truck is provided with a pantograph and travels in a trolley mode under electric power from an overhead wire and a non-trolley mode without obtaining electric power. The pantograph has a base frame, a bottom frame and a top frame rockably attached to the base frame, and a collector shoe supported by the top end portion of the top frame. A fixing member is disposed on the top end side of the top frame for fixing the pantograph, a hook device is disposed on the base frame, and a hook receiver is disposed on the base frame in order to receive the fixing member. When a frame assembly formed of the bottom frame and the top frame is folded, the fixing member becomes seated in the hook receiver and is pressed by means of the hook device, thereby securely fixing the frame assembly to the base frame.

7 Claims, 3 Drawing Sheets

(51) Int. Cl.
*B60L 5/28* (2006.01)
*B60L 5/36* (2006.01)
*B60L 3/00* (2006.01)
*B60L 9/22* (2006.01)
*B60L 11/08* (2006.01)

(56) References Cited

U.S. PATENT DOCUMENTS

| | | | | |
|---|---|---|---|---|
| 5,124,510 | A * | 6/1992 | Garfinkle | 191/65 |
| 5,954,171 | A * | 9/1999 | Gramatke et al. | 191/60.3 |
| 6,474,455 | B1 * | 11/2002 | Blaschko et al. | 191/45 R |
| 6,591,953 | B2 * | 7/2003 | Blanvillain | 191/60.2 |
| 2011/0106349 | A1 * | 5/2011 | Sakita | 701/22 |
| 2013/0105264 | A1 * | 5/2013 | Ruth et al. | 191/59.1 |
| 2014/0005871 | A1 * | 1/2014 | Saito et al. | 701/22 |
| 2014/0041951 | A1 * | 2/2014 | Tojima et al. | 180/2.1 |
| 2014/0097054 | A1 * | 4/2014 | Francke et al. | 191/59.1 |
| 2014/0138200 | A1 * | 5/2014 | Dronnik et al. | 191/59.1 |
| 2014/0195091 | A1 * | 7/2014 | Saito | 701/22 |
| 2014/0224609 | A1 * | 8/2014 | Saito et al. | 191/59.1 |

FOREIGN PATENT DOCUMENTS

| | | |
|---|---|---|
| JP | 09-107603 A | 4/1997 |
| JP | 2004-304895 A | 10/2004 |
| JP | 2007-028814 A | 2/2007 |
| WO | 2011/135870 A1 | 11/2011 |

* cited by examiner

TROLLEY-TYPE TRUCK

TECHNICAL FIELD

The present invention relates to a trolley-type truck used for ore transportation in a large-scale mine and the like, and is suitable specifically to a trolley-type dump truck traveling with a combination of a trolley mode for traveling by electric power obtained from an overhead wire and a non-trolley mode for traveling without obtaining electric power from an overhead wire which is by electric power obtained by driving a generator with an engine and the like.

BACKGROUND ART

As a trolley-type truck of this kind, one shown in Japanese Patent Application Laid-Open No. S63-35102 (Patent Literature 1) and the like can be cited.

In the trolley-type truck of Patent Literature 1, a dump truck used for ore transportation in a large-scale mine is described, and it is described that the dump truck travels by a generator driven by an engine in the non-trolley mode, and travels by external electric power by collecting electricity through a double-track type overhead wire by a pair of pantographs mounted on the truck in the trolley mode. Also, in the Patent Literature, an invention is described in which the pantograph is immediately descended when the pantograph deviates from the overhead wire.

CITATION LIST

Patent Literature

Patent Literature 1: Japanese Patent Application Laid-Open No. S63-35102

SUMMARY OF THE INVENTION

Technical Problem

Such trolley-type truck as described in Patent Literature 1 travels with a combination of a trolley mode for traveling by electric power obtained from an overhead wire in a place where an overhead wire (trolley wire) supplying electric power is arranged and a non-trolley mode for traveling by electric power obtained by driving a generator with an engine. Because the road surface of the portion where the trolley wire is arranged is leveled well and is made flat normally, there is no possibility that the truck vertically moves violently, rocks largely to the right and left, or vibrates severely.

However, a majority of the road surface of the place where the trolley wire is not arranged is not leveled sufficiently, and unevenness, stones and the like are usually spotted. Therefore, the truck rocks largely and vibrates severely, though sufficient consideration has not been paid so far with respect to the effect of such large rocking and severe vibration on the pantograph arranged on the truck. Consequently, it is feared that the pantograph fails by deformation or is broken when enormous load is applied to the pantograph for a long time.

The object of the present invention is to obtain a trolley-type truck that can prevent the pantograph mounted on the truck traveling combining the trolley mode and non-trolley mode from failing by deformation and being broken.

Solution to Problem

In order to achieve the object, the present invention is a trolley-type truck provided with a pantograph mounted on the truck and traveling with a combination of a trolley mode for traveling by means of electric power obtained from an overhead wire and a non-trolley mode for traveling without obtaining electric power from the overhead wire, in which the pantograph is configured so that a collector shoe vertically ascends/descends while keeping the attitude with respect to a base frame by including the base frame, a bottom frame rockably attached to the base frame, a top frame rockably attached to the bottom frame, and the collector shoe rockably supported by a top end portion of the top frame and changing the crossing angle of the bottom frame and the top frame, and the pantograph is configured to include a fixing member disposed on the top end side of the top frame and fixing the pantograph, a hook device disposed on the base frame and fixing the fixing member for fixing the pantograph by securely pressing the fixing member, and a hook receiver disposed on the base frame in order to receive the fixing member that is securely pressed by the hook device, and is configured so that, when a frame assembly including the bottom frame and the top frame is folded, the fixing member is seated on the hook receiver, is securely pressed by means of the hook device, and is thereby fixed to the base frame.

Also, "securely" described above means that the fixing member does not rattle against severe vibration and rocking when the trolley-type truck travels in the non-trolley mode. Also, the present invention is suitable to a dump track for a mine used for ore transportation and the like in a mine.

Particularly, it is preferable that the hook device is configured to include a hook section for pressing the fixing member, a support member for turnably supporting the hook section, and a hydraulic cylinder for turning the hook section and securely pressing the fixing member.

Also, it is preferable that the hook receiver includes a receiving section of a V-shape for securely receiving the fixing member in the front/back direction, a base section for fixing the receiving section to the base frame, and an elastic material disposed on a surface on the receiving side of the receiving section. Further, it is preferable that the hook device includes hook section opening/closing detecting means (limit switch and the like) for detecting the open/close state of the hook section.

Also, in the above, it is more preferable that lateral rocking preventing means for preventing lateral rocking of the frame assembly when the frame assembly including the bottom frame and the top frame is in a folded state is disposed on the base frame.

Another feature of the present invention is a trolley-type truck provided with a pantograph mounted on the truck and traveling with a combination of a trolley mode for traveling by means of electric power obtained from an overhead wire and a non-trolley mode for traveling without obtaining electric power from the overhead wire, in which the pantograph is configured so that a collector shoe vertically ascends/descends while keeping the attitude with respect to a base frame by including the base frame, a bottom frame rockably attached to the base frame, a top frame rockably attached to the bottom frame, and the collector shoe rockably supported by a top end portion of the top frame and changing the crossing angle of the bottom frame and the top frame, and lateral rocking preventing means for preventing lateral rocking of the frame assembly when the frame assembly including the bottom frame and the top frame is in a folded state is disposed on the base frame.

In the above, it is preferable that the lateral rocking preventing means is a frame assembly guide including a pair of steel sheets disposed so as to embrace both sides of the frame assembly, a frame assembly protection member made of a synthetic resin is disposed on the inner side of each of the pair of steel sheets, and the frame assembly protection member protects the frame assembly against collision and slide even when the frame assembly collides on and slides against the frame assembly guide when the frame assembly is stored in the frame assembly guide.

Also, it is preferable that projections for preventing the frame assembly from directly contacting the frame assembly guide are disposed in portions of the bottom frame and the top frame stored in the frame assembly guide.

Advantageous Effects of the Invention

According to the present invention, in a trolley-type truck traveling with a combination of a trolley mode and a non-trolley mode, an effect of being capable of surely preventing the pantograph mounted on the truck from failing by deformation or being broken can be obtained.

DESCRIPTION OF EMBODIMENTS

Below, concrete embodiments of the present invention will be described using the drawings. Also, in each drawing, portions marked with same reference sign express same portions.

Embodiment 1

A first embodiment of a trolley-type truck of the present invention will be described using FIG. 1 to FIG. 6.

Figure 1:
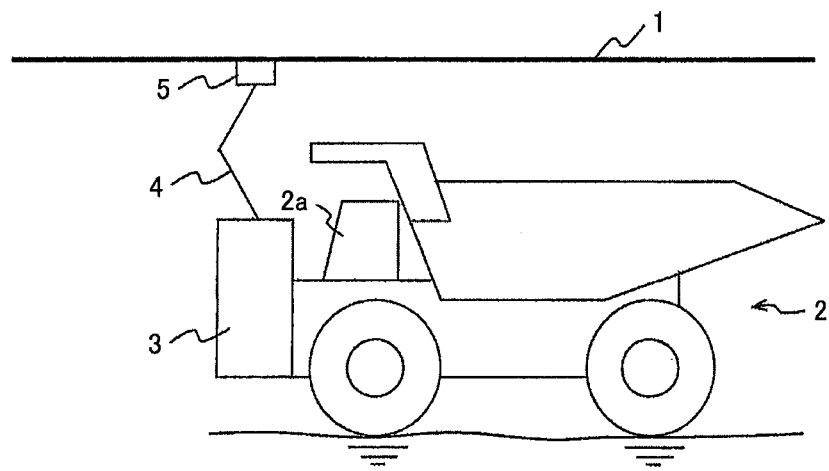
FIG. 1 is an overall configuration schematic drawing explaining a first embodiment of a trolley-type truck of the present invention.

FIG. 1 is an overall configuration schematic drawing describing the first embodiment of the trolley-type truck of the present invention. In this embodiment, the present invention will be described exemplifying a trolley-type dump truck used in ore transportation and the like in a large-scale mine.

In FIG. 1, 1 is an overhead wire (trolley wire) extended over the running route of a mine, 2 is a dump truck of the trolley type, and this dump truck 2 is a dump truck of the electrically driven type traveling with a combination of the trolley mode for traveling by electric power obtained from the overhead wire 1 and the non-trolley mode traveling by electric power obtained by driving a generator with an engine. In the present embodiment, it is configured to travel using either the trolley mode or the non-trolley mode at all times, and, particularly in climbing a slope, it is configured to be capable of improving the climbing speed by traveling with the trolley mode using electric power obtained from the overhead wire 1. Also, when the dump truck is used under an environment requiring large power such as a steep slope, it is also possible to be configured to travel using electric power obtained from the overhead wire 1 and electric power obtained by the engine simultaneously.

Also, in traveling by driving a generator by the engine (normally diesel engine), the AC driving method is employed in which electricity obtained by the generator is controlled by a control device such as an inverter and the like, and an alternate current (AC) motor (induction motor) is thereafter driven for traveling. Further, by employing an IGBT (Insulated Gate Bipolar Transistor) inverter, it is also possible to exert more powerful electrical brake force.

On the upper part of the dump truck 2, a pantograph 4 is mounted. More specifically, a deck 3 for mounting the pantograph thereon is installed in the front part of the dump truck 2, and the pantograph 4 for collecting electricity from the overhead wire 1 is installed in the upper part of the deck 3 (the front upper part of a driver's cab 2a). 5 is a collector shoe in the upper part of the pantograph which contacts and slides against the overhead wire 1 and collects electricity from the overhead wire 1.

Figure 2:
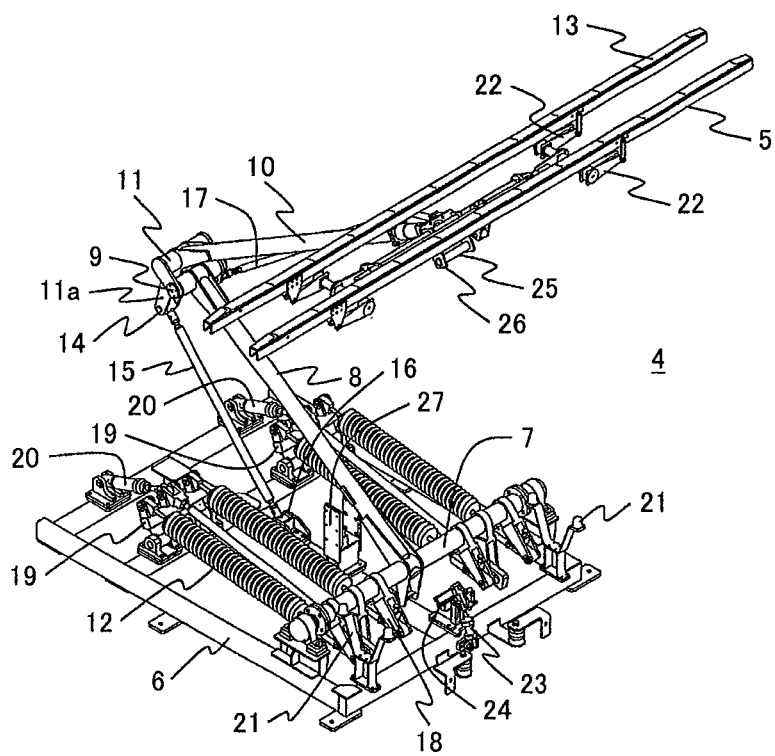
FIG. 2 is an overall perspective view of a pantograph mounted on the trolley-type truck in the first embodiment of the present invention.

FIG. 2 is a perspective view showing the overall construction of the pantograph 4 shown in FIG. 1, and the configuration of the pantograph in the present embodiment will be described using this FIG. 2.

In FIG. 2, 6 is a base frame of the pantograph attached to the upper part of the pantograph mounting deck 3 shown in FIG. 1. On the upper surface of the base frame 6, a rocking support shaft 7 is disposed in the width direction (lateral direction) of the truck (vehicle). This rocking support shaft 7 is formed of a cylindrical member, and is inserted to a support shaft (not shown) fixed to the base frame 6 in a rockable manner. The base end portion of a bottom frame 8 is fixedly arranged in the middle section of the rocking support shaft 7, and is configured to be rockable along with the rocking support shaft 7.

Therefore, this bottom frame 8 rises and falls around the rocking support shaft 7. At the top end portion (upper end portion) of the bottom frame 8, a connecting shaft 9 is disposed so as to be parallel to the rocking support shaft 7, and a base end portion 11 of a top frame 10 is rockably connected to the connecting shaft 9.

By the top end portion (upper end portion) of the top frame 10, the collector shoe 5 is rockably supported through a shoe support 22 and the like. Also, between the rocking support shaft 7 and the base frame 6, springs 12 are disposed. These springs 12 impart a drive force of the direction of erecting the frame assembly formed of the bottom frame 8, the top frame 10 and the like from a state the pantograph is folded as shown in FIG. 4 to a state shown in FIG. 2 and FIG. 3 along with hydraulic cylinders 20.

When the truck travels, the collector shoe 5 rises and falls with respect to the base frame 6 while changing the crossing angle of the bottom frame 8 and the top frame 10 according to the change of the distance between the base frame 6 of the pantograph and the overhead wire 1. Even in this case, it is configured that the attitude of the collector shoe 5 is kept constant and the sliding state of a sliding plate 13 disposed on the upper surface of the collector shoe 5 and the overhead wire 1 is properly maintained. Therefore, link mechanisms are disposed in the connecting section of the top end portion of the bottom frame 8 and the base end portion 11 of the top frame 10 and in the connecting section of the top end portion of the top frame 10 and the collector shoe 5, and it is configured that the attitude of the collector shoe 5 does not change regardless of rising/falling of the bottom frame 8 and the top frame 10.

More specifically, a balancing arm 11a is arranged integrally in the base end portion 11 of the top frame 10 so as to project downward, and the balancing arm 11a is configured to rock with the top frame 10 around the connecting shaft 9. Also, an upper balancing shaft 14 is disposed at the top end portion of the balancing arm 11a so as to be parallel to the connecting shaft 9, and the top end portion (upper end portion) of a lower balancing bar 15 is rockably attached to the upper balancing shaft 14. The base end portion (lower end portion) of the balancing bar 15 is rockably attached to the upper surface of the base frame 6 through a lower balancing shaft 16.

Further, a balancing arm (not shown) is disposed on the lower surface of the collector shoe 5 also, one end of an upper balancing bar 17 is rockably attached to the balancing arm, and the other end of the upper balancing bar 17 is rockably attached to the periphery of the connecting shaft 9 in the vicinity of the top end portion of the bottom frame 8.

With such configuration, the attitude of the collector shoe 5 is configured so as not to change regardless of rising/falling of the bottom frame 8 and the top frame 10.

In the present embodiment, as shown in FIG. 2, four of the springs 12 are arranged in the axial direction of the rocking support shaft 7, and one end sides of respective springs 12 are connected respectively to link arms 18 fixedly provided on the rocking support shaft 7. Also, the other end sides of respective springs 12 are configured so that two springs are connected to same rocking member 19 and four springs 12 shrink/expand by two hydraulic cylinders 20 arranged in the right and left. The base end side of the rocking member 19 is rockably attached to the base frame 6. Further, the base end side of the hydraulic cylinders 20 is also rockably attached to the base frame 6. With such configuration, by shrinking/expanding the hydraulic cylinders 20, it is possible to erect the frame assembly of the pantograph 4 to raise the collector shoe 5 to contact the overhead wire 1, and to fold the frame assembly to lower the collector shoe 5 so as to be stored. Also, by a spring force of the springs 12, the collector shoe 5 is pressed to the overhead wire 1 with a constant force through the bottom frame 8 and the top frame 10. At the same time, with these configurations, the collector shoe 5 can move vertically following the height change of comparatively large amplitude of the overhead wire 1.

21 shown in FIG. 2 are shoe receivers, and it is configured that the lower surface of the collector shoe 5 is supported by these shoe receivers 21 when the pantograph 4 is folded. Also, the shoe support 22 described above is rotatably pivoted to the top end of the top frame 10 and the balancing bar 17, and the collector shoe 5 is attached to and supported by the top end portion of the top frame 10 through the shoe support 22.

Figure 3:
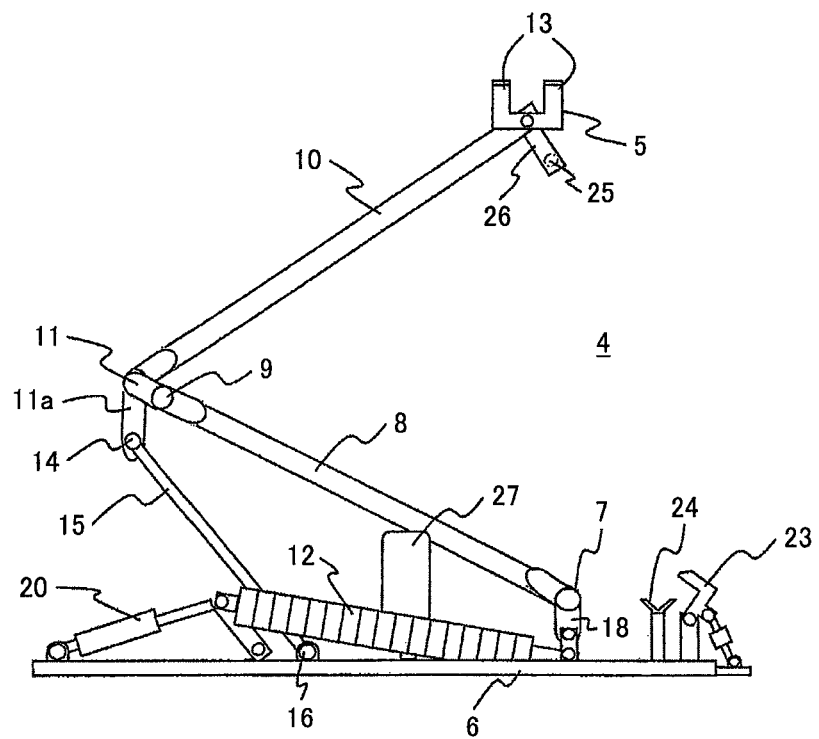
FIG. 3 is a schematic front view of the pantograph shown in FIG. 2 and is a drawing of a state the pantograph is erected.
Figure 4:
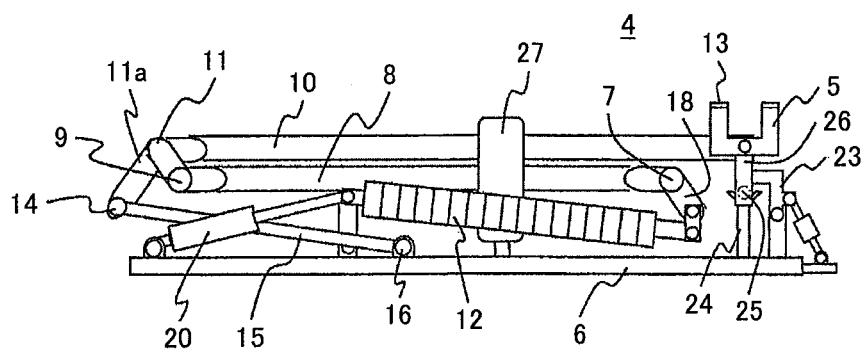
FIG. 4 is a schematic front view of the pantograph shown in FIG. 2 and is a drawing of a state the pantograph is folded.

Further, 23 shown in FIG. 2 to FIG. 4 is a hook device, 24 is a hook receiver, and 25 is a pipe (fixing member) for fixing the pantograph attached to the top end side of the top frame 10 (below the collector shoe 5) through a bracket 26 so as to be parallel to the collector shoe 5. The pipe 25 is seated on the hook receiver 24 when the pantograph is folded (at the time of being stored), and is securely pressed by the hook device 23 (refer to FIG. 4). Thus, it is configured that the frame assembly (the bottom frame 8, the top frame 10 and the like) of the pantograph 4 can be prevented from being deformed and being broken by vibration even when the truck violently vibrates or largely rocks during traveling in the non-trolley mode.

Also, 27 shown in FIG. 2 to FIG. 4 is a frame assembly guide (lateral rocking preventing means for frame assembly), and is for suppressing lateral rocking and violent vibration to the right and left of the frame assembly of the pantograph 4 due to violent vibration and large rocking during traveling in the non-trolley mode in which the pantograph 4 is folded (refer to FIG. 4).

Figure 5:
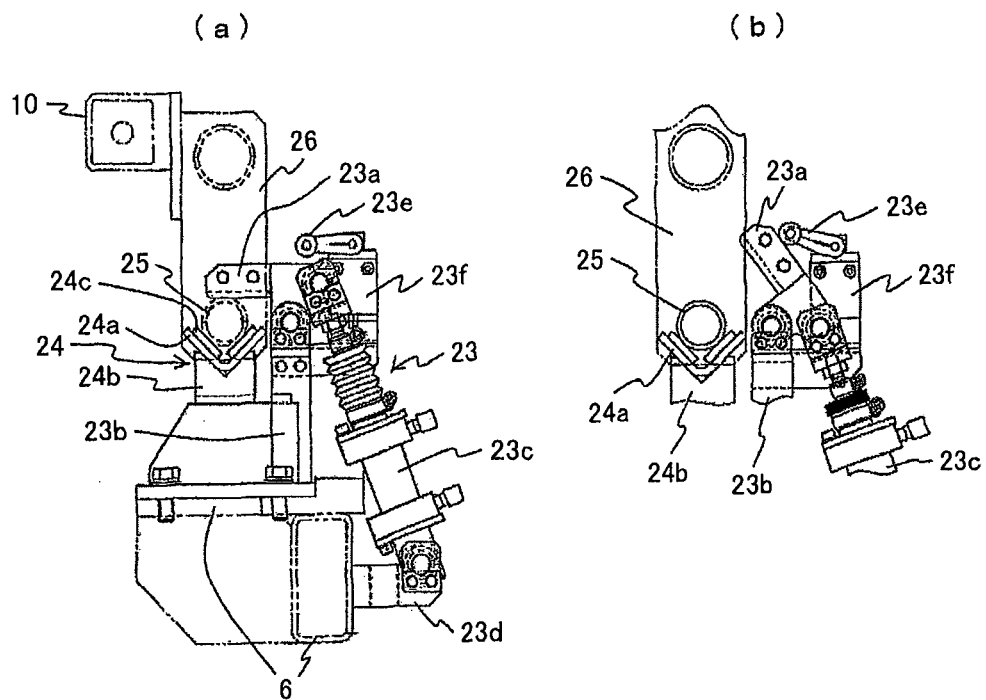
FIG. 5 is an enlarged detailed drawing of a portion of a hook device of the pantograph shown in FIG. 2, (a) is a front view showing the lock state of the hook device, and (b) is a drawing showing the unlocked state of the hook device and is a partial front view showing only the vicinity of the hook device.

Next, the configuration of the portion of the hook device and the hook receiver 24 shown in FIG. 2 to FIG. 4 will be described in detail by FIG. 5. In FIG. 5, (a) is a front view showing the locked state of the hook device, and (b) is a drawing showing the unlocked state of the hook device and is a partial front view showing only the vicinity of the hook device.

The hook device 23 is formed of a hook section 23a for pressing the pipe 25 arranged in the frame assembly of the pantograph 4, a support member 23b for turnably attaching the hook section 23a thereto, a hydraulic cylinder 23c for turning the hook section 23a, and the like. 23d is a bracket fixedly attached to the side surface of the base frame 6 of the pantograph, and is for turnably attaching the base end side of the hydraulic cylinder 23c thereto. 23e is a limit switch (hook section opening/closing detecting means) for detecting the open/close state of the hook section 23a, and the base end side of the limit switch 23e is turnably attached to a support deck 23f that is fixed to the support member 23b. Also, when the hook section 23a is in the locked state as shown in the drawing (a), the limit switch 23e is brought to the horizontal position, and the locked state can be detected. Further, when locking is released and the hook section 23a turns to the right as shown in the drawing (b), the limit switch 23e is pressed by the back surface of the hook section 23a, the limit switch 23e also turns to the right, and the unlocked state of the hook section 23a can be detected.

The hook receiver 24 is for allowing the pipe (fixing member) 25 attached to the upper part of the frame assembly (the top end side of the top frame 10) of the pantograph 4 to be seated thereon as shown in FIG. 5 (a), (b), a receiving section 24a thereof is of V-shape so as to be capable of securely receiving the pipe 25 in the vertical direction and the front/back direction of the vehicle (truck), and the receiving section 24a is fixed by welding and the like to a base section 24b that is fixed to the upper surface of the base frame 6 by bolts. Also, a rubber plate (elastic material) 24c is arranged on the pipe receiving side of the receiving section 24a, and the rubber plate 24c has functions of preventing shifting, preventing impact and preventing breakage when the pipe 25 attached to the front end side of the top frame 10 is fixed by the hook section 23a.

Further, in the present embodiment, the support member 23b of the hook section 23a is also fixed integrally to the base section 24b of the hook receiver 24 and is fixed by bolts to the upper surface of the base frame 6 along with the base section 24b.

As shown in this FIG. 5, because the present embodiment is configured that the hook device 23 and the hook receiver 24 are provided and the pipe 25 attached to the top frame 10 of the pantograph 4 is securely and constantly pressed by a hydraulic force of the hydraulic cylinder 23c, the pipe 25 pressed to the hook receiver 24 is securely fixed at all times without rattling against violent vibration and rocking and without increase of the play (gap) due to rattling. Therefore, even when the truck 2 travels on a rough road surface in the non-trolley mode, the pantograph 4 can be surely prevented from being broken or deformed by violent vibration and large rocking.

In the present embodiment described above, although a force for pressing the hook section 23a is applied by the hydraulic cylinder 23c, by also using a strong spring, an air cylinder and the like in lieu thereof, the hook section 23a can be pressed securely to some extent. However, because a spring or air utilizes elastic deformation for pressing, in order to strongly press so that the pantograph does not shift even when large vibration and rocking occur, extremely large spring or air cylinder is required, and becomes expensive and large, and therefore a spring or an air cylinder is hard to be employed as a pantograph for a truck.

On the other hand, in one a hydraulic cylinder is used, because oil is used, shrinkage does not occur like the case of the air even when strong pressure is applied, and pressure can be applied constantly so that the pipe 25 is held by the receiving section 24a constantly and stably without rattling even when a load caused by large vibration and rocking is applied to the pipe 25. Also, manufacturing can become very inexpensive because even a small-sized hydraulic cylinder can secure a large force, and truck itself is commonly equipped with a hydraulic source in a dump truck and the like for a mine and the like and the hydraulic source can be utilized.

Figure 6:
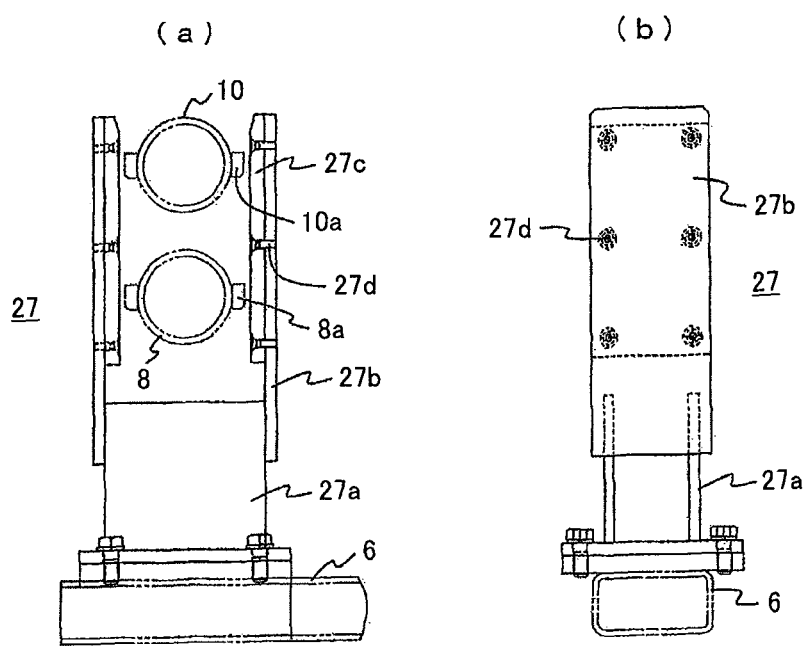
FIG. 6 is an enlarged detailed drawing of a portion of a frame assembly guide shown in FIG. 2, (a) is a front view of the frame assembly guide, and (b) is a side view of the frame assembly guide.

Next, the configuration of a portion of the frame assembly guide 27 shown in FIG. 2 to FIG. 4 will be described in detail by FIG. 6. FIG. 6 is an enlarged detailed drawing of a portion of the frame assembly guide, (a) is a front view of the frame assembly guide, and (b) is a side view of the frame assembly guide.

The frame assembly guide (frame assembly lateral rocking preventing means) 27 has a function of suppressing lateral rocking and large vibration of the frame assembly of the pantograph 4 in the right and left direction by violent vibration and rocking during traveling in the non-trolley mode in which the pantograph 4 is folded. In FIG. 6, 27a is a support section attached to the base frame 6 of the pantograph by bolts and the like, 27b are a pair of steel sheets attached respectively to the right and left upper parts of the support section 27a by welding and the like, and 27c are frame assembly protecting members attached to the inside of each of the right and left pair of the steel sheets 27b by screws 27d.

Also, in the drawing (a) of FIG. 6, 8 shown by two-dot chain lines is the bottom frame of the frame assembly of the pantograph 4, 10 shown by two-dot chain lines is the top frame of the same, and it is configured that the bottom frame 8 and the top frame 10 are stored between the right and left steel sheets 27b of the frame assembly guide 27 as shown in the drawing when the frame assembly is in the folded state. To the portions of the bottom frame 8 and the top frame 10 stored in the frame assembly guide 27, projections 8a, 10a are attached respectively. These projections 8a, 10a are for preventing the frame assembly from directly bumping into (contacting) the frame assembly guide 27 when the bottom frame 8 and the top frame 10 are stored in the frame assembly guide 27.

The frame assembly protecting member 27c is formed of a plate-like member made of a synthetic resin (polyamide and the like for example). Even when the frame assembly slides against the frame assembly guide when the frame assembly (the bottom frame 8 and the top frame 10) is to be stored or while the frame assembly is stored in the frame assembly guide, the frame assembly protecting member 27c improves slidability thereof and prevents the frame assembly from being damaged, and, even when the frame assembly bumps into the frame assembly guide 27, the frame assembly protecting member 27c protects the frame assembly against the impact.

In the present embodiment, because the frame assembly guide 27 described above is provided in the upper part of the base frame 6 of the pantograph 4, even when a trolley-type dump truck violently vibrates or rocks during traveling in the non-trolley mode, the frame assembly of the pantograph 4 can be suppressed from laterally rocking with respect to the base frame 6 or largely vibrating in the right and left direction, and therefore the frame assembly of the pantograph can be prevented from being deformed or broken.

In the embodiment of the present invention described above, because both of the hook device 23 shown in FIG. 5 and the frame assembly guide 27 shown in FIG. 6 are used, even when the truck violently vibrates or largely rocks during traveling in the non-trolley mode, the frame assembly of the pantograph 4 can be securely fixed to the base frame 6, and therefore the frame assembly of the pantograph can be surely prevented from being deformed or broken.

In other words, because the pipe 25 attached to the front end of the top frame 10 can be securely fixed to the base frame 6 by the hook device 23 and the hook receiver 24, the frame assembly can be surely prevented from vibrating in the vertical direction, and can be suppressed also from vibrating in the right and left direction by a pressing force of the hook device.

Also, because the vicinity of the generally center part of the bottom frame 8 and the top frame 10 can be held by the frame assembly guide 27 so as not to rock to the right and left, rocking or vibrating particularly in the right and left direction can be surely suppressed.

Further, although it is preferable to use both of the hook device 23 and the frame assembly guide 27 as the first embodiment, the present invention is not necessarily limited to an invention using both of them, deformation and breakage of the pantograph frame assembly can be suppressed even in using the hook device 23 only or the frame assembly guide 27 only, and use of either one of the hook device 23 or the frame assembly guide 27 is within the range of the present invention.

REFERENCE SIGNS LIST

1 . . . overhead wire (trolley wire)
2 . . . dump truck
3 . . . pantograph mounting deck
4 . . . pantograph
5 . . . collector shoe
6 . . . base frame
7 . . . rocking support shaft
8 . . . bottom frame
8a . . . projection
9 . . . connecting shaft
10 . . . top frame
10a . . . projection
12 . . . spring
13 . . . sliding plate
15 . . . lower balancing bar
17 . . . upper balancing bar
18 . . . link arm
19 . . . rocking member
21 . . . shoe receiver
22 . . . shoe support
23 . . . hook device
23a . . . hook section
23b . . . support member
23c . . . hydraulic cylinder
23e . . . limit switch (hook section opening/closing detecting means)

24 ... hook receiver
24a ... receiving section
24b ... base section
24c ... rubber plate (elastic material)
25 ... pipe (fixing member) for fixing pantograph
27 ... frame assembly guide (frame assembly lateral rocking preventing means)
27a ... support section
27b ... steel sheet
27c ... frame assembly protecting means
27d ... screw

The invention claimed is:

1. A trolley-type truck adapted for traveling with a combination of a trolley mode for traveling using electric power obtained from an overhead wire and a non-trolley mode for traveling without obtaining electric power from the overhead wire;
a pantograph mounted on the trolley-type truck, the pantograph having a frame assembly including a base frame attached to the trolley-type truck, a bottom frame rockably attached to the base frame, a top frame rockably attached to the bottom frame and having a top frame top end portion, and a collector shoe rockably supported by the top end portion of the top frame, the pantograph being configured so that the collector shoe can vertically ascend and descend while maintaining a set attitude with respect to the base frame and while changing a crossing angle of the bottom frame and the top frame;
a fixing member disposed on the top end portion of the top frame;
a hook device disposed on the base frame and including a hook section engageable with the fixing member for fixing the pantograph, a hook receiver disposed on the base frame to receive the fixing member, a support member for turnably supporting the hook section and a hydraulic cylinder for turning the hook section and for securely pressing the fixing member engaged by the hook section into engagement with the hook receiver;
whereby, when the frame assembly, including the bottom frame and the top frame, is folded, the fixing member is seated on the hook receiver, is securely and constantly pressed by the hook device, and is thereby fixed to the base frame.

2. The trolley-type truck according to claim 1,
wherein the hook receiver includes a receiving section having a V-shape to securely receive the fixing member in a front/back direction of the trolley-type truck, a base section for fixing the receiving section to the base frame, a fixing member receiving surface and an elastic material disposed on the fixing member receiving surface of the receiving section.

3. The trolley-type truck according to claim 1,
further including a lateral rocking preventing means for preventing lateral rocking of the frame assembly when the frame assembly, including the bottom frame and the top frame, is in a folded state and is disposed on the base frame.

4. A trolley-type truck traveling with a combination of a trolley mode for traveling using electric power obtained from an overhead wire and a non-trolley mode for traveling without obtaining electric power from the overhead wire;
a pantograph mounted on the trolley-type truck, the pantograph having a frame assembly including a base frame attached to the trolley-type truck, a bottom frame rockably attached to the base frame, a too frame rockably attached to the bottom frame and having a too frame too end portion, and a collector shoe rockably supported by the too end portion of the too frame, the pantograph being configured so that the collector shoe can vertically ascend and descend while maintaining a set attitude with respect to the base frame and while changing a crossing angle of the bottom frame and the top frame;
a lateral rocking preventing means for preventing lateral rocking of the frame assembly when the frame assembly, including the bottom frame and the top frame, is in a folded state and is disposed on the base frame;
wherein the lateral rocking preventing means includes a frame assembly guide including a pair of steel sheets disposed to embrace sides of the frame assembly, a frame assembly protection member made of a synthetic resin and disposed on an inner side of each of the pair of steel sheets, and further
wherein the frame assembly protection member protects the frame assembly against collision and slide when the frame assembly contacts and slides with respect to the frame assembly guide when the frame assembly is stored in the frame assembly guide.

5. The trolley-type truck according to claim 3,
wherein the lateral rocking preventing means includes a frame assembly guide including a pair of steel sheets disposed to embrace sides of the frame assembly, a frame assembly protection member made of a synthetic resin and disposed on an inner side of each of the pair of steel sheets, and further wherein the frame assembly protection member protects the frame assembly against collision and slide when the frame assembly contacts and slides with respect to the frame assembly guide when the frame assembly is stored in the frame assembly guide.

6. The trolley-type truck according to claim 5,
wherein projections for preventing the frame assembly from directly contacting the frame assembly guide are disposed in portions of the bottom frame and the top frame stored in the frame assembly guide.

7. The trolley-type truck according to claim 4, wherein projections for preventing the frame assembly from directly contacting the frame assembly guide are disposed in portions of the bottom frame and the top frame stored in the frame assembly guide.

* * * * *